March 28, 1967  J. B. TOOMEY, JR., ET AL  3,310,967
PHOTOGRAPHIC FLASH BULB
Filed March 4, 1965
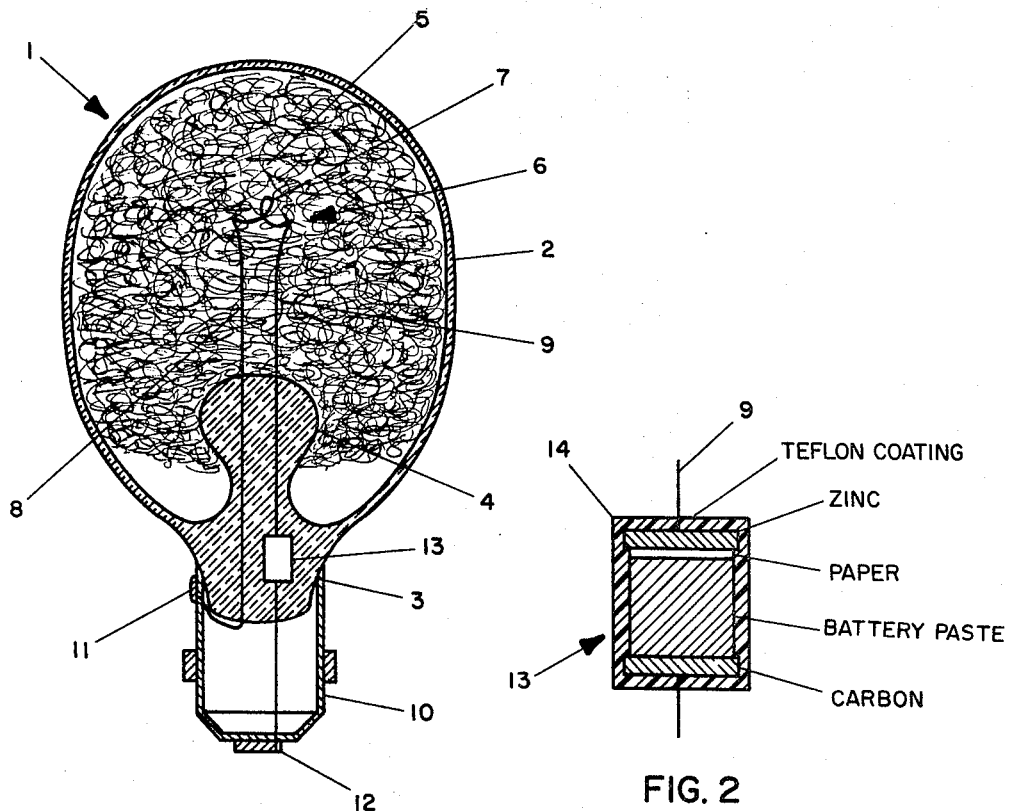
FIG. 1
FIG. 2
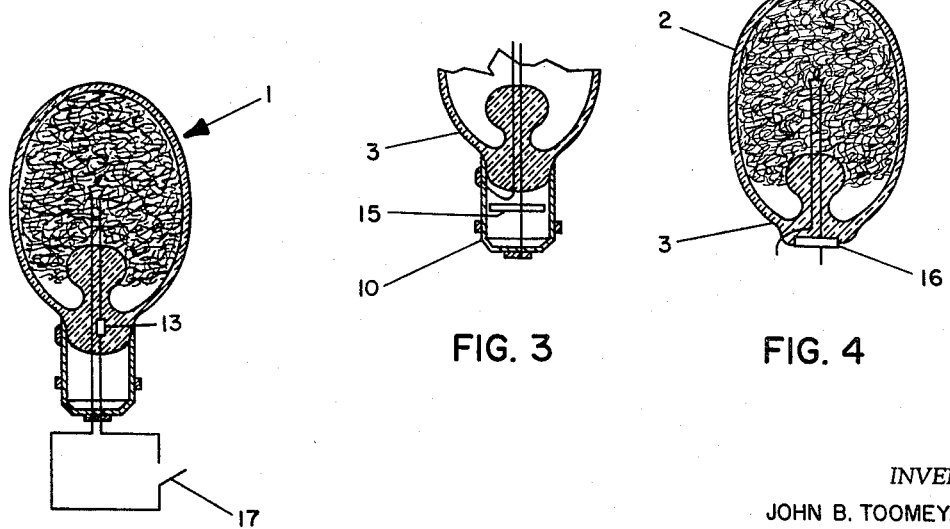
FIG. 3
FIG. 4
FIG. 5
INVENTOR
JOHN B. TOOMEY, JR.
WILLIAM F. FRIZZELL
BY Edmund M. Jaskiewicz
ATTORNEY

United States Patent Office 3,310,967
Patented Mar. 28, 1967

3,310,967
PHOTOGRAPHIC FLASH BULB
John B. Toomey, Jr., and William F. Frizzell, Alexandria,
Va., assignors to Value Engineering Company, Alexandria, Va., a corporation of Virginia
Filed Mar. 4, 1965, Ser. No. 437,215
4 Claims. (Cl. 67—31)

The present invention relates to a photo flash bulb adapted to be ignited electrically, more particularly, to such a flash bulb having a self-contained battery in the base thereof which battery is capable of providing sufficient voltage to cause ignition of the flash bulb.

The conventional photo flash bulb comprises a glass envelope having a base which is inserted into a corresponding socket on a flash attachment for a camera. Within the envelope is an ignitable substance which radiates actinic light when burned. This substance is ignited by an igniting mechanism usually comprising one or more filaments which are connected by current supply wires to two contacts provided on the base of the flash bulb. Electric current to actuate the igniting mechanism is provided by an external source of electrical energy such as an electric cell which when connected in circuit with the contents on the base of the flash bulb by a switch in synchronization with the shutter of the camera the ignitable substance will be ignited.

Such electric cells are usually mounted in the flash attachment and are used a number of times. However, it is difficult for the photographer to ascertain when the electric cell becomes exhausted since when the cell is tested there is an indication of current, but this current may not be sufficient to ignite the flash bulb. Thus not only is it necessary to provide an external source of electrical energy to ignite the conventional flash bulb but this source of energy must be frequently checked to insure that sufficient electric current will be generated to ignite the flash bulb. When the flash attachment including the electric cell is not used for a long period of time the cell will not generate sufficient electricity and the result would be a badly underexposed photograph.

It is therefore the principal object of the present invention to provide a novel and improved photo flash bulb.

It is another object of the present invention to provide a flash bulb having a self contained electric battery therein.

It is a further object of the present invention to provide a photo flash bulb which eliminates the necessity of providing an external source of electrical energy to ignite the flash bulb.

The present invention essentially comprises a photo flash bulb having a self contained battery mounted therein and connected between the mechanism for igniting the ignitable substance within the envelope of the bulb and contacts on the base of the bulb. With this arrangement, the flash bulb can be ignited merely by short circuiting the contacts on the base thereof.

The battery is composed of battery paste and may be enclosed in a plastic coating. The battery may also be embedded in the base portion of the envelope of the bulb. The battery is of sufficient size to generate voltage to ignite once the flash bulb.

Other objects and advantages of the present invention will be apparent upon reference to the accompanying specification when taken in conjunction with the following drawings wherein;

FIGURE 1 is a vertical sectional view of a photo flash bulb embodying the present invention;

FIGURE 2 is a vertical sectional view in enlarged scale of the self contained battery employed in the flash bulb of FIGURE 1;

FIGURE 3 is a vertical sectional view of the base of the flash bulb of FIGURE 1 and showing a modification of the mounting of the battery;

FIGURE 4 is a vertical sectional view of the envelope of the flash bulb of FIGURE 1 and showing still another modification in the mounting of the battery in the base portion of the envelope; and FIGURE 5 is an electrical diagram showing schematically the manner of igniting the flash bulb of the present invention.

Proceeding next to the drawings wherein the reference symbols indicate the same parts throughout the various views a specific embodiment of this invention will be described in detail. With particular reference to FIGURE 1 a flash bulb according to the present invention is illustrated generally at 1. The flash bulb comprises an envelope 2 of a light transmitting material such as glass and has a base portion 3 with a re-entrant portion 4 extending inwardly of the envelope from the base portion 3.

The interior of the envelope 2 is filled with a metallic mass of combustible actinic light producing material 5 in the form of fine wires, shredded foil or leaf foil. This material may be aluminum, magnesium or a suitable alloy of aluminum and magnesium.

The light producing material 5 is ignited by a mechanism indicated generally at 6 and which may comprise a filament 7 of a high melting point, high resistance metal such as tungsten. The filament 7 is connected between two electrical leads 8 and 9 which extend downwardly into the re-entrant portion 4 and project outwardly at the bottom of the base portion 3 of the envelope. Other forms of igniting mechanism may be used and these include the omission of a filament with a primer on the ends of the wires 8 and 9. The primer is of a composition known in the art and such primers generally comprise a porous mixture of a readily ignitable metallic powder such as zirconium or a mixture of zirconium with magnesium and an oxidizing agent such as potassium perchlorate bonded together by a suitable binder such as nitrocellulose.

The base portion 3 is enclosed by a base 10 which has contacts 11 and 12 thereon in a conventional manner.

The entire construction of the flash bulb as described thus far is conventional and it is emphasized that other known structures of flash bulbs may be employed with this invention.

In order to provide a source of electrical energy within the flash bulb structure as described above a self contained battery 13 is embedded in the base portion 3 of the envelope and connected in the lead 9. The battery 13 is illustrated in greater detail in FIGURE 2 and comprises an electrochemical source of electrical energy which as shown in FIGURE 2 comprises a thin zinc strip with a coating of paper to serve as the cathode and a carbon strip as the anode and an electrolyte in the form of a battery paste between the two electrodes. This electrolyte is an aqueous solution of ammonium chloride with water and saturated in granulated carbon and powdered manganese dioxide. The entire cell is then coated with a plastic such as Teflon and indicated at 14. This unit has a radius of approximately one-sixteenth of an inch and a length of one-quarter of an inch. This size unit with the composition as described above produced a discharge voltage of 1.47 voltes D.C. This voltage is more than adequate to ignite the flash bulb since tests on flash bulbs of different makes showed the minimum voltage required for ignition of the flash bulb to be 0.815 volt. These flash bulbs would draw between 7–35 milliamps on ignition and this magnitude of current is readily provided by the cell as described above.

Other forms of the battery 13 may comprise a cathode of amalgamated zinc and anode of depolarized copper and an electrolyte comprising a solution of caustic potash. The terminal voltage of this cell was 0.70 volt.

A further form of cell included a cathode of cadmium amalgam, an anode of mercury and an electrolyte composed of a paste of cadmium sulphate. The terminal voltage of this cell was 1.01 volts D.C. The voltages of the cells were all at room temperature or 20 degrees C.

It is pointed out that all of the cells described above are of the same dimension but generated at different voltages.

The battery 13 may also have the shape of a disc as illustrated at 15 in FIGURE 3 and positioned across the diameter of the base 10.

The battery may also have the form of a disc as indicated at 16 in FIGURE 4 and be embedded in the base portion 3 across the diameter thereof.

The operation of the flash bulb of this invention is illustrated in FIGURE 5 where the flash bulb is ignited merely by closing a circuit across the leads 8 and 9 of the bulb. In practice this is accomplished by closing the switch 17 which corresponds to the shutter switch of the camera. With the flash bulb within the socket of the flash attachment, closing the shutter switch 17 completes a circuit across the contacts 11 and 12 and enables the battery 13 to discharge its voltage and thereby actuate the igniting mechanism to ignite the flash bulb.

The flash bulb of this invention can be used in present flash attachments which have the conventional provision for a battery as the source of electrical energy. In such flash attachments the battery is removed since it is not necessary and a bar of an electrically conducting material such as copper or aluminum is inserted in the battery space so that an electrical circuit is formed.

It is pointed out that the envelope 2 of the flash bulb is usually made of glass. When the base portion 3 of the envelope is being formed the battery 13 may be embedded in the molten glass and connected to the lead 9 as shown. The battery with its plastic coating will thus have an indefinite shelf life and will generate sufficient electrical energy to ignite the flash bulb when desired.

The battery as it is positioned in the base is an operative battery and to discharge the battery it is only necessary to close the circuit across the battery. Thus when the circuit is completed across the contacts of the flash bulb there is no delay in the ignition of the flash bulb as would be the case when the battery is inoperative and it is necessary to bring an electrolyte in contact with the electrode.

In the case of a large flash bulb as would be used for professional outdoor shots a number of such batteries as described above could be assembled in the flash bulb to provide increased voltage.

While one conventional form of flash bulb has been described above it is pointed out that this invention may be incorporated in other types of flash bulbs.

Thus it is apparent that the present invention has disclosed an improved flash bulb which has a self contained electrical battery therein so as to eliminate the need for an external source of electrical energy. The flash bulb can be ignited merely by closing a circuit across the contacts of the bulb. The battery is completely enclosed either by a plastic coating or by the material of the envelope of the flash bulb and has an indefinite shelf life. The result is an improved flash bulb which can be depended upon to ignite and to give good results whenever required without the problem of first determining whether the external source of electrical energy will be able to ignite the flash bulb.

It will be understood that this invention is susceptible to modifications in order to adapt it to different usages and conditions and, accordingly, it is desired to comprehend such modifications within this invention as may fall within the scope of the appended claims.

What is claimed is:

1. A photo flash bulb adapted to be ignited electrically and comprising a glass envelope capable of transmitting light and having a molded glass base portion, a substance within said envelope adapted to be ignited electrically and burned to radiate actinic light, means within said envelope for igniting said substance, a base enclosing said base portion of the envelope and having a pair of spaced electrically insulated contacts thereon, a first lead electrically connecting said igniting means and one of said contacts, and an electrochemical source of energy imbedded in said base portion capable of supplying a quantity of electrical energy sufficient for igniting once said substance and electrically connected between said igniting means and the other of said contacts whereby closing a circuit across said contacts will enable said electrochemical source to ignite the photo flash bulb.

2. A photo flash bulb adapted to be ignited electrically and comprising an envelope composed at least partially of a light transmitting material and having a base portion, a substance within said envelope adapted to be ignited electrically and burned to radiate actinic light, means within said envelope for igniting said substance, a base mounted on said base portion of the envelope and having a pair of spaced electrically insulated contacts thereon, a first lead electrically connecting said igniting means and one of said contacts, and an electrochemical source of energy imbedded in said base portion and capable of supplying a quantity of electrical energy sufficient for igniting once said substance and electrically connected between said igniting means and the other of said contacts whereby closing a circuit across said contacts will enable said electrochemical source to ignite the photo flash bulb.

3. A photo flash bulb as claimed in claim 2 wherein said electrochemical source comprises an anode and a cathode spaced therefrom with battery paste therebetween.

4. A photo flash bulb adapted to be ignited electrically and comprising an envelope composed at least partially of a light transmitting material, a substance within said envelope adapted to be ignited electrically and burned to radiate actinic light, means within said envelope for igniting said substance, a base mounted on said envelope and have a pair of spaced electrically insulated contacts thereon, a first lead electrically connecting said igniting means and one of said contacts, and an electrochemical source of energy embedded in the material of said envelope and capable of supplying a quantity of electrical energy sufficient for igniting once said substance and electrically connected between said igniting means and the other of said contacts whereby closing a circuit across said contacts will enable said electrical chemical source to ignite the photo flash bulb.

References Cited by the Examiner
UNITED STATES PATENTS

| | | | |
|---|---|---|---|
| 2,625,575 | 1/1953 | Ellis | 136—107 |
| 2,723,549 | 11/1955 | Martin | 67—31 |
| 3,156,587 | 11/1964 | Wolfe | 136—107 X |

FREDERICK L. MATTESON, JR., *Primary Examiner.*

ROBERT A. DUA, *Examiner.*